2,706,160
A METHOD OF MAKING A MOLDED LIGNOCELLULOSE PRODUCT

William T. Glab, Dubuque, Iowa, assignor to Carr, Adams & Collier Company, a corporation of Iowa No Drawing. Application June 16, 1951,
Serial No. 232,066

2 Claims. (Cl. 106—163)

This invention relates to methods of making a molded lignocellulose product containing finely-divided lignocellulose and finely-divided sulfur with at least a portion of the sulfur being chemically reacted with the lignocellulose.

It is the general object of this invention to provide methods of making a molded lignocellulose product.

Another object is to provide methods of making such a lignocellulose product in which the lignocellulose material is initially in the form of particles having a moisture content preferably not exceeding about 30% by weight and containing from about 0.5 to 20%, and preferably about 10 to 20%, by weight of sulfur particles substantially all of which are not coarser than about 100 mesh in size, and wherein this mixture is heated to an elevated temperature preferably between about 400 and 600° F. for a time sufficient to combine chemically at least a portion of the sulfur with the lignocellulose.

A further object is to provide methods wherein the above material is compressed at a pressure preferably at least about 50 pounds per square inch while heating at an elevated temperature preferably between about 400 to 600° F. for a time sufficient to produce a compact self-sustaining product.

In general, the method of this invention involves a relatively dry process in which finely-divided lignocellulose and a small amount of finely-divided sulfur are mixed together to form a substantially homogeneous mixture and this mixture is then heated to combine chemically at least a portion of the sulfur with the lignocellulose. Where the lignocellulose and sulfur mixture is given a preferred preliminary heat treatment, the product of this treatment is a molding composition that may be molded under pressure with heat to produce a product having the shape of the mold cavity. The heat treated product is thermoplastic and thus flowable and moldable when heated further so that heat and pressure can be used in the customary manner to produce shaped products. The thermoplasticity of the material is proven by the fact that it can be cooled and then molded under heat and pressure.

It has long been known that lignocellulose particles such as finely-divided wood can be compressed into a coherent mass by heat and pressure as the heat apparently causes the lignin to become plastic and serve as a binder. The temperatures required, however, are so high that they cause rapid and almost spontaneous decomposition of the lignocellulose so that this method is not practical. By the methods of this invention, where sulfur is employed with the lignocellulose, such decomposition is largely, although not completely, avoided so that temperatures may be used to produce a plastic mass that can easily be molded under pressure. Thus the sulfur appears to retard thermal decomposition of the lignocellulose. Furthermore, in the presence of sulfur, at least a part of the reaction products of the lignocellulose are polymerized. The materials used are relatively dry and preferably do not contain over 30% of water by weight of the dry lignocellulose, which is approximately the fiber saturation point.

The lignocellulose that may be used in this invention includes wood as well as other lignocellulosic vegetable materials as well as partially pulped or hydrolyzed lignocellulose material. In order to insure intimate contact of the materials the lignocellulose is finely divided with the particles preferably being not coarser than about 20 mesh in size although particles passing through a 50 mesh screen produce a smoother, stronger and finer grained final product. As was explained above, the lignocellulose should be relatively dry, preferably containing not more than about 30% moisture by weight of the dry lignocellulose. In the preferred methods of making the products of this invention, the lignocellulose is bone dry. This means that there is substantially no loss in weight upon heating at 212° F.

The amount of sulfur used to make the products of this invention is preferably from about 0.5 to about 20% by weight of the dry lignocellulose. It has been found that if too small an amount of sulfur is used, the resulting composition is difficult to mold and is not very water resistant. If too much sulfur is used, the product is somewhat weakened. Although as little as 0.5% sulfur can be used to make improved products, low amounts of sulfur produce a product in which the amount of combined sulfur is low and the binding power is consequently reduced. In general, the preferred amount of sulfur is from about 10 to about 20% by weight of the dry lignocellulose. In this high range the amount of chemically bound sulfur is correspondingly high and the sulfur has the binding power of a vulcanizate. Because of this, a stronger, tougher product is produced when the amount of sulfur is relatively great.

The particle size of the sulfur should be small in order to insure even distribution of the sulfur through the lignocellulose and to bring the sulfur into intimate contact with the particles of lignocellulose. In general, the particle size of the sulfur is preferably not coarser than about 100 mesh and is preferably finer than 200 or 300 mesh. These limitations mean that the sulfur used is that which will pass through standard screens of these sizes.

In preparing the products of this invention the lignocellulose and sulfur, both in finely-divided form as described, are intimately mixed together to produce a substantially homogeneous mixture. This mixture is then preferably initially compacted so that during the subsequent heating step relatively good heat transfer may be achieved. The mixture is then preferably given an initial heating, or preheat, either under no pressure or light pressure in order to combine chemically a portion of the sulfur with the lignin and the cellulose and to drive off the initially copious gases which are believed to include water vapor, sulfur containing compounds and other gaseous degradation products. This initial heat treatment also makes the lignocellulose more thermoplastic for subsequent molding operations. The preheat temperature is relatively high to drive off these vapors and cause the chemical combination of some of the sulfur but is maintained low enough so that excess charring is avoided and loss of high boiling fractions is avoided.

The product of this preheat treatment is a molding composition that is capable of being molded under pressure and heat in a mold of a desired shape to produce molded products. This molding composition is a mixture of substantially dry lignocellulose with some free sulfur and some chemically bound sulfur substantially uniformly distributed therethrough. In the preferred preheat process the temperature is maintained between about 400 and 600° F. for about 2 to 20 minutes, and preferably about 3 to 10 minutes. It has been found that if too low a temperature is used an insufficient amount of the sulfur will be chemically bound with the lignin and the cellulose. If too high a temperature is used the reactions and the evolution of the gases will be so violent that explosions are liable to occur. Furthermore, at excessively high temperatures there is danger that the sulfur will ignite. In general, a temperature of about 550° F. has been found to be highly satisfactory.

The product of the above described preliminary heat treatment may be stored and then subsequently used as a thermoplastic molding composition from which molded products may be made. The material may also be used as a filler and reinforcement for various plastic materials and other molded products so that the amount of resin can be greatly reduced without sacrifice of strength.

The preheat time required is generally greater as the percentage of sulfur is increased. Thus a 5% sulfur product can be molded at 5 minutes while a 15% sulfur content requires 6 minutes or more. In the 15% product too much vapor is present to mold at 5 minutes. In general, the shortest preheat time possible produces the strongest board. Thus a 15% board is stronger when molded after a 6 minute preheat than it is after an 8 minute preheat. Dimensional stability, however, increases with increased time of preheat. Sufficient preheat must be used to plasticize the material as otherwise a non-uniform product with relatively reduced strength is produced. A product of about maximum strength possible has been produced with approximately 10% sulfur and a 5½ minute preheat at 550° F.

The thermoplastic molding composition prepared as described may be molded in a heated pressure mold of a desired shape to produce molded products. In this step the preheat composition is compressed for a relatively brief period at a desired pressure and heated generally within the same temperature range as was used in the preliminary heating. The pressure that is employed is governed by the desired characteristics in the final product. In general, this pressure will be between about 50 and 5,000 pounds per square inch. At the lower pressures the product will be found to be more porous and somewhat fragile. However, low pressure products may be used as insulation and for other uses where fragility is not a detriment and where the porosity of the product may be of advantage. At the higher pressures, the product is hard, dense and compact and more nearly resembles molded thermosetting resins such as the highly reacted phenol-formaldehyde resins. Where the final product is to be a building board or wood panel substitute, the molding pressure is preferably between about 400 and 750 pounds per square inch.

In the final molding operation the pressure is maintained for only a brief period during the heating operation. In general, this period will be between about ¼ and 2 minutes. If the heating time is too short the heat will not have time to penetrate the molding material; if the time is too long there is some danger of excessive pressure build-up within the mold. In general, high temperatures require relatively brief molding times, and low temperatures require relatively longer molding times.

The density of the final product depends at least in part on the pressure employed in the final molding step. In actual practice this apparent specific gravity has been found to vary from about 0.25 to about 1.40 with the denser materials being produced at greater pressures.

In one method of practicing this invention to make a compact self-sustaining hard board that can serve as a wood board substitute in that it can be sawed, nailed, shaped and similarly treated, finely-divided *ponderosa* pinewood not coarser than about 50 mesh and being substantially bone dry was mixed with 15% by weight of sulfur substantially all of which was of a size to pass through a 100 mesh screen. The wood and sulfur were intimately mixed to produce a substantially homogeneous product. About 1¾ inches of loose mixture was partly compacted into a square mold frame about 1" deep. This mold frame rested on a fine mesh wire screen which in turn contacted a bottom metal plate, all of which had been preheated to about 550° F. A preheated metal top plate and block were then placed in the mold and the mold with the sawdust-sulfur mixture therein placed on the heated platen of a press. The mixture within the mold was compacted at a pressure of about 400 pounds per square inch in order to increase the efficiency of heat transfer through the mass and this pressure immediately removed. The heated platen was maintained at a temperature such as to heat the wood and sulfur to about 550° F. This preheating was maintained for about 5 minutes during which relatively copious gases were given off. The screen aided in venting these gases, although boards smooth on both sides have been prepared without the use of a screen.

At the end of the preheat period the partially reacted mass was compacted between the heated platens of the press for about 15 seconds at about 700 pounds per square inch pressure. This time interval permitted the mass to reach a substantially uniform density throughout. At the end of this time period the pressure was released to release entrapped gases from within the mold. As soon as these entrapped gases had been vented, pressure was again applied at 700 pounds per square inch and the mass simultaneously heated at about 550° F. for about ½ minute. At the end of this time the screen backing was removed and pressure and heat were again applied for about ½ minute to produce a fairly smooth bottom surface on the molded product. The mold and molded product were then removed from the press and the resulting board was removed from the mold. The molded product was a substantially uniform dense board about 3/16" thick and was practically jet black in color. It was found to have approximately 2.85% of combined sulfur and only about 0.04% of free sulfur. The resulting board was found to have a high tensile strength, a specific gravity of about 1.3, a low water absorption when immersed in water for a 24 hour or longer period and very little swelling in water and it contained a very small amount of water soluble material. The board was capable of being sawed, nailed, shaped and otherwise handled much in the same manner as ordinary wood boards, composition boards, or plastic materials may be handled.

During the preheat treatment to make the molding composition used in the final molding operation, the sulfur apparently melts and partially vaporizes so as to make more intimate contact with the lignocellulose. The sulfur can also be provided from materials capable of releasing sulfur at the temperatures and under the conditions employed. Thus various sulfides such as metal sulfides may be employed, if desired, if they have a decomposing temperature such that during the preheat treatment the sulfur is released in appreciable quantities.

Although the chemistry involved in this invention is not completely understood, it appears that the melted sulfur reacts with the various components of the lignocellulose material to form sulfur compounds and vulcanizates. It appears that essentially a vulcanizing reaction takes place with unsaturated bonds being provided in the lignocellulose as a result of the heat treatment and the sulfur reacting at these bonds in a manner similar to the action of sulfur in the vulcanization of rubber.

The products made according to the methods of this invention are extremely strong and have good structural stability on soaking in water for from 24 to 48 hours. The amount of water absorbed is also relatively small. After soaking for 24 hours in water at room temperature, the maximum change in test specimens in thickness is about 11.9% and this ranged downwardly to about 1.8%. The change in length in these specimens was between 0 for the best and about 2.9% for the worst specimens.

The molded products of this invention may contain reinforcing fibers or other compounding ingredients, such as additives, to change the characteristics of the final product. Thus, if desired, plasticizers may be used to aid the final molding operation. These plasticizer additives may include long chain fatty acids, glycols, other polyhydric alcohols and the like.

While the invention has been disclosed and described herein in a particular embodiment and in considerable detail, it is not intended that the invention be limited to the specific disclosures made. On the contrary, it is intended to cover all modifications and alternative constructions falling within the spirit and scope of the invention as defined in the appended claims.

I claim:

1. The method of making a lignocellulose product consisting essentially of intimately mixing particles of lignocellulose materials having a maximum average particle size of about 50 mesh and a maximum moisture content of about 30% by weight with from about 0.5–20% by weight of sulfur particles having a maximum average particle size of about 100 mesh, heating the mixture at from about 400–600° F. for a time sufficient to combine chemically a substantial portion of the sulfur with the lignocellulose, venting the fumes from said chemical combining, and again heating at a temperature of from about 400–600° F. at a molding pressure, said combined heating being for a time sufficient to combine chemically at least a major portion of said sulfur present in said product with said lignocellulose.

2. The method of claim 1 wherein the molding pressure is at least about 50 pounds per square inch.

References Cited in the file of this patent

UNITED STATES PATENTS

| | | |
|---|---|---|
| 1,832,807 | Ellis | Nov. 17, 1931 |
| 1,980,979 | Becher | Nov. 20, 1934 |
| 2,237,048 | Carter | Apr. 1, 1941 |
| 2,381,269 | Elmendorf et al. | Aug. 7, 1945 |
| 2,490,078 | Meiler | Dec. 6, 1949 |
| 2,552,597 | Smith et al. | May 15, 1951 |

FOREIGN PATENTS

| | | |
|---|---|---|
| 354,001 | Great Britain | Aug. 6, 1931 |
| 571,786 | Great Britain | Sept. 10, 1945 |